US00RE41300E

(19) United States
(12) Reissued Patent
Tani

(10) Patent Number: US RE41,300 E
(45) Date of Reissued Patent: May 4, 2010

(54) MOVABLE BODY DISPENSING DEVICE

(75) Inventor: Yoshikazu Tani, Tokyo (JP)

(73) Assignee: Tokiwa Corporation, Gifu (JP)

(21) Appl. No.: 11/592,315

(22) Filed: Nov. 2, 2006

Related U.S. Patent Documents

Reissue of:
(64) Patent No.: 6,811,062
Issued: Nov. 2, 2004
Appl. No.: 10/614,452
Filed: Jul. 7, 2003

(30) Foreign Application Priority Data

Jul. 9, 2002 (JP) ..... P2002-200309
May 15, 2003 (JP) ..... P2003-137803

(51) Int. Cl.
*B67D 5/42* (2006.01)

(52) U.S. Cl. ..... 222/390; 222/391; 401/172
(58) Field of Classification Search ..... 222/390, 222/391; 401/171–176, 179, 180, 182
See application file for complete search history.

(56) References Cited

U.S. PATENT DOCUMENTS

| | | | | |
|---|---|---|---|---|
| 5,323,934 | A | 6/1994 | Isert | |
| 5,725,133 | A | 3/1998 | Iaia | |
| 5,851,079 | A | 12/1998 | Horstman et al. | |
| 6,155,735 | A | 12/2000 | Nakajima | |
| 6,227,739 | B1 | 5/2001 | Kageyama | |
| 6,923,349 | B2 * | 8/2005 | Lou | 222/521 |

FOREIGN PATENT DOCUMENTS

| | | |
|---|---|---|
| DE | 3940967 | 6/1991 |
| DE | 3940967 | 6/1992 |
| EP | 0 371 135 | 1/1989 |
| EP | 0 715 821 | 11/1995 |
| EP | 0715821 | 6/1996 |
| EP | 1002478 | 3/1999 |
| EP | 1 002 478 | 5/2000 |
| JP | 58-24537 | 2/1983 |
| JP | 59151631 | 8/1984 |
| JP | 63-57275 | 4/1988 |
| JP | 2019290 | 1/1990 |
| JP | 3-112131 | 11/1991 |
| JP | 6-21515 | 3/1994 |
| JP | 2000/262324 | 9/2000 |

OTHER PUBLICATIONS

Notification of Reasons for Refusal, during the prosecution of corresponding Japanese Patent Application No. 2003–137803, with English translation (7 pages).

(Continued)

*Primary Examiner*—J. Casimer Jacyna
(74) *Attorney, Agent, or Firm*—Osha • Liang LLP

(57) ABSTRACT

It becomes possible for the rotational force generated by an operating member (12, ) to be transmitted to a cylindrical movable body (13) by means of a shaft member (62) inserted slidably in the longitudinal direction in a non-rotatable fashion, inside the movable body (13), and moreover, the shaft member (62) becomes able to pass inside the movable body (13) by penetrating through the inner side of the ratchet spring section (81), a composition being adopted wherein the shaft member (62) passes through the female screw thread (11a) of the main body (11) which screws together with the male screw thread (13a) of the movable body (13). Thereby, the shaft member (62) forming a tube side rotation preventing section and the female screw thread (11a) of the main body (11) forming a tube side screw thread section overlap mutually in the same plane orthogonal to the axial direction, and furthermore, the shaft member (62) forming the tube side rotating preventing section and the ratchet teeth (14a, 14b) overlap mutually in the same plane in orthogonal to the axial direction. Consequently, the overall length can be shortened in comparison to a prior art movable body dispensing device, whilst maintaining the same dispensing amount, and hence satisfactory downsizing can be achieved.

15 Claims, 6 Drawing Sheets

OTHER PUBLICATIONS

Notification of Reasons for Refusal, during the prosection of corresponding Japanese Patent Application No. 2005–185323, with English translation (8 pages).

English translation of Abstract of Japanese Publication No. JP–2000–262324, dated Sep. 26, 2000 (1 page).

English translation of Abstract of Japanese Publication No. JP–2019290, dated Jan. 23, 1990 (1 page).

English translation of Abstract of Japanese Publication No. JP–59151631, dated Aug. 30, 1984 (1 page).

* cited by examiner

MOVABLE BODY DISPENSING DEVICE

Matter enclosed in heavy brackets [ ] appears in the original patent but forms no part of this reissue specification; matter printed in italics indicates the additions made by reissue.

BACKGROUND OF THE INVENTION

1. Field of the Invention

The present invention relates to a movable body dispensing device used, for example, for a liquid cosmetic material extruding vessel, or the like, by which the user can extrude and use liquid cosmetic material contained therein, as appropriate.

2. Related Background Art

Prior Art

A conventional movable body dispensing device is disclosed, for example, in Japanese Patent Application Laid-Open No. 2000-262324, which comprises: a columnar movable body formed with a male screw thread on the outer circumference thereof, and being formed with a plurality of longitudinally extending grooves that are open to the outer side and are aligned in the circumferential direction; a cylindrical main body, having a female screw thread, which screws together with the male thread of the movable body inserted from the rear side of the cylindrical main body, formed on the intermediate portion of the inner circumference of the cylindrical main body; and a cylindrical operating member coupled rotatably to the rear end section of the main body, having projecting ribs which interlock with the grooves of the movable body and are provided on the inner circumference of the cylindrical operating member; the movable body being inserted slidably in a non-rotatable fashion in the longitudinal direction and the movable body being progressively dispensed by relative rotation of the main body and the operating member.

SUMMARY OF THE INVENTION

Problems to be Solved by the Invention

However, in recent years, with consumer needs which emphasize the portability and ease of use of products, there have been demands to compactify products by shortening the overall length of conventional movable body dispensing devices, without changing the length of the movable body dispensed by same.

Therefore, it is an object of the present invention to provide a movable body dispensing device which is capable of shortening the overall length of the device in comparison with the prior art, whilst maintaining the same dispensing amount, in such a manner that product downsizing can be achieved satisfactorily.

Means for Solving the Problems

In order to resolve the aforementioned problem, the movable body dispensing device relating to a first aspect of the invention is a movable body dispensing device comprising: a cylindrical movable body having a male screw thread formed on the external circumference thereof; a cylindrical main body having a female screw thread which screws together with the male screw thread of the movable body, formed on the intermediate portion of the internal circumference thereof; a cylindrical operating member coupled rotatably to the rear end section of the main body, comprising a shaft member provided so as to project towards the front side from a base provided at the rear end thereof, the shaft member being fittable slidably in the longitudinal direction, in a non-rotatable fashion, into the movable body engaged with the female screw thread; and a ratchet comprising a set of ratchet teeth and a ratchet spring, for restricting the movement of the movable body in the forward direction or rearward direction; the movable body being progressively dispensed by causing relative rotation of the main body and the operating member; wherein a step section between the internal circumference of the intermediate portion and the internal circumference of the region apart from the intermediate portion is formed on the inner part of the cylindrical main body; the ratchet comprises a cylindrical ratchet spring section whereon at least one of the set of ratchet teeth and the ratchet spring are formed integrally; and the ratchet spring section is sandwiched between the step section of the main body and the inner side of the operating member, in such a manner that the shaft member penetrates through the inner side thereof and thereby enables the movable body to pass through the same.

Moreover, the movable body dispensing device relating to a second aspect of the invention is a movable body dispensing device comprising: a cylindrical movable body having a male screw thread formed on the external circumference thereof; a cylindrical main body having a female screw thread which screws together with the male screw thread of the movable body, formed on the intermediate portion of the internal circumference thereof; and a cylindrical operating member coupled rotatably to the rear end section of the main body, comprising a shaft member provided so as to project towards the front side from a base provided at the rear end thereof, the shaft member being fittable slidably in the longitudinal direction, in a non-rotatable fashion, into the movable body engaged with the female screw thread; the movable body being progressively dispensed by causing relative rotation of the main body and the operating member; wherein a plurality of projecting ribs respectively projecting to the outer side and extending in the longitudinal direction are formed in the circumferential direction on the external circumference of the shaft member; a plurality of grooves with fit mutually with the projecting ribs of the shaft member are formed on the internal circumference of the movable body; and the projecting ribs of the shaft member are constituted by projecting ribs wherein the intermediate portion thereof is larger than the size of the grooves, in such a manner that the region thereof from the front end side to the intermediate portion thereof can be inserted inside the grooves of the movable body, further insertion beyond this being prevented, and the movable body and the shaft member being maintained in prescribed relative positions in the radial direction.

In the technical means of this kind, desirably, the projecting ribs of the shaft member are formed on either side of depression sections having a recess shaped cross section, by excavating a plurality of locations so as to form a recess shaped cross section.

Moreover, the movable body dispensing device relating to a third aspect of the invention is a movable body dispensing device comprising: a main body tube; an operating tube provided on the rear end section of this main body tube and capable of relative rotation with respect to the main body tube; a movable body comprising a rotation preventing section and a screw thread section, inserted inside the main body tube and the operating tube; a tube side rotation preventing section for engaging in a non-rotatable fashion with the rotation preventing section of the movable body and guiding the movable body slidably in the axial direction; a tube side screw thread section for screwing together with the screw thread section of the movable body; and ratchets provided respectively on the main body tube and the operating tube, for mutually meshing and permitting rotation in one direction in synchronism with the relative rotation; the movable body being dispensed progressively towards the front end of the main body tube by means of the screwing together of the screw thread sections, the engagement of the rotation preventing sections, and the meshing of the ratchets; wherein the movable body is formed in a cylindrical shape, the screw thread section of the movable body being provided on either one of the inner circumference or external circumference thereof, and the rotation preventing section of the movable body being provided on the other of the inner circumference or external circumference; and the tube side rotation preventing section, the tube side screw thread section and the ratchets being arranged in an overlapping fashion in the same plane orthogonal to the axial direction.

In the technical means of this kind, desirably, there are also provided: a shaft member installed on the base section of the operating tube in a protruding manner in the axial direction; and a cylindrical member having a cylindrical shape and being installed consecutively so as to surround the front end side of the shaft member, whilst also being coupled in a non-rotatable fashion to the main body tube; the movable body being inserted in between the shaft member and the cylindrical member, the rotation preventing section of the movable body being provided on the internal circumference of the movable body, and the screw thread section of the movable body being provided on the external circumference of the movable body; the tube side rotation preventing section being provided on the external circumference of the shaft member and engages with the rotation preventing section of the movable body formed on the internal circumference of the movable body; the tube side screw thread section being provided on the internal circumference of the cylindrical member and screws together with the screw thread section of the movable body on the external circumference of the movable body; and the ratchets being arranged in such a manner that they surround the cylindrical member, or alternatively, there are also provided: a shaft member installed on the base section of the operating tube in a protruding manner in the axial direction; and a cylindrical member having a cylindrical shape and being installed consecutively so as to surround the front end side of the shaft member, whilst also being coupled in a non-rotatable fashion to the main body tube; the movable body being inserted in between the shaft member and the cylindrical member, the rotation preventing section of the movable body being provided on the external circumference of the movable body, and the screw thread section of the movable body being provided on the internal circumference of the movable body; the tube side rotation preventing section being provided on the internal circumference of the cylindrical member and engages with the rotation preventing section of the movable body formed on the external circumference of the movable body; the tube side screw thread section being provided on the external circumference of the shaft member and screws together with the screw thread section of the movable body on the internal circumference of the movable body; and the ratchets being arranged in such a manner that they surround the cylindrical member.

In the present invention, references to male screw thread and female screw thread include the concept of screw thread type projections and grooves which have a similar action to screw threads.

DESCRIPTION OF THE PREFERRED EMBODIMENTS

Embodiments

Below, an embodiment of the present invention is described in detail with reference to the accompanying drawings.

Here, the movable body dispensing device is described with respect to a case where it is applied to a liquid cosmetic material extruding vessel for extruding a liquid cosmetic material, such as foundation, blusher, or beauty lotion, but the invention is not limited to this and the following description would also be appropriate in the case of application to a liquid material, such as ink for a writing instrument, liquid pharmaceuticals, or the like, and also to a bar-shaped cosmetic material dispensing vessel for dispensing a bar-shaped cosmetic material which is a solid material, or the like.

Figure 1:
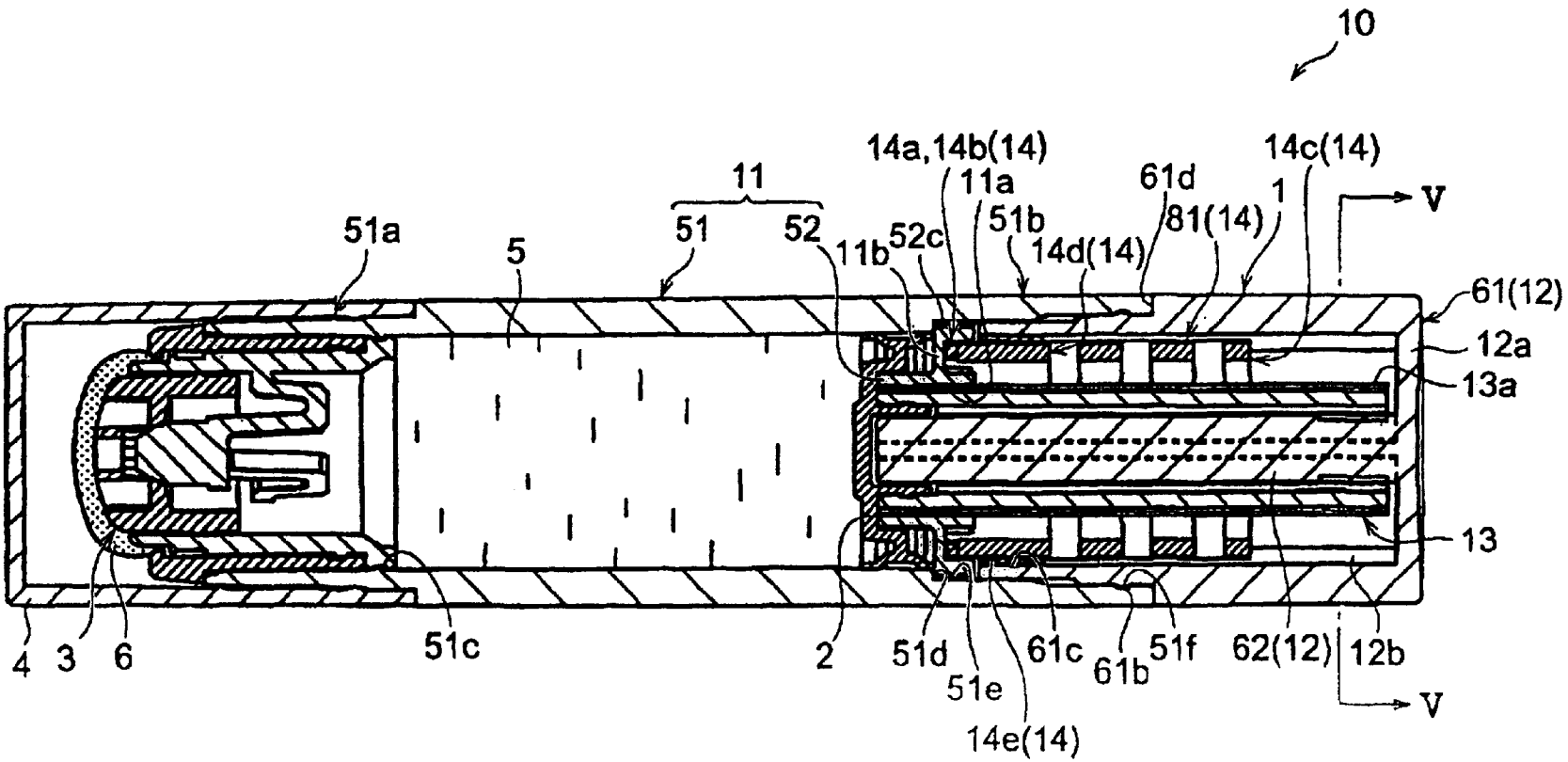
FIG. 1 is a vertical sectional view (before dispensing of the movable body) showing a liquid cosmetic extruding vessel to which the movable body dispensing device relating to one embodiment of the present invention is applied.
Figure 2:
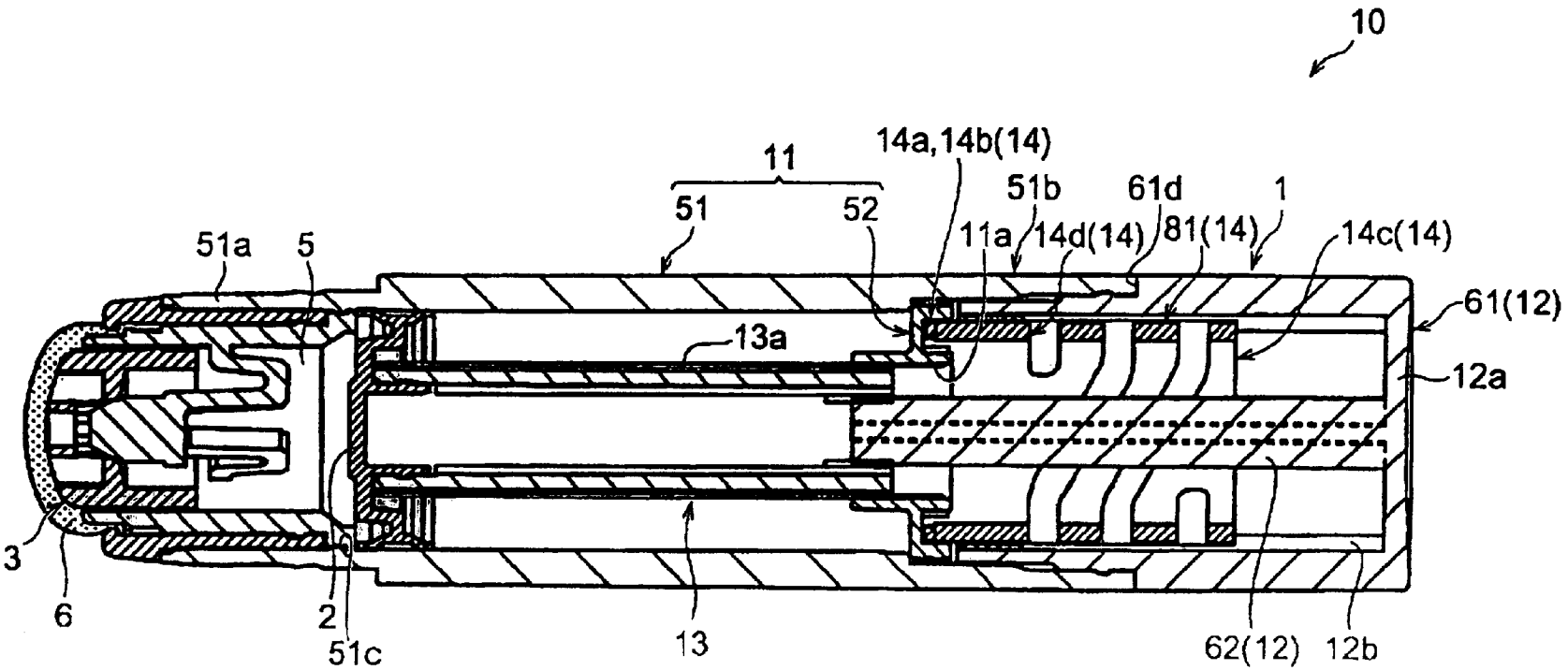
FIG. 2 is a vertical sectional view (after dispensing of the movable body) showing a liquid cosmetic extruding vessel to which the movable body dispensing device relating to one embodiment of the present invention is applied.

FIG. 1 is a vertical sectional view (before dispensing of the movable body) showing the overall composition of a liquid cosmetic material dispensing vessel to which a movable body dispensing device relating to a first embodiment of the present invention is applied; and FIG. 2 is a vertical sectional view (after dispensing of the movable body) showing the overall composition of a liquid cosmetic material dispensing vessel to which the same movable body dispensing device is applied.

In the present embodiment, as illustrated in FIG. 1, the liquid cosmetic dispensing vessel 10 comprises a movable body dispensing device 1, a piston 2, an discharge lid 3, and a cap 4. Moreover, as illustrated in FIG. 1 and FIG. 2, this liquid cosmetic material dispensing vessel 10 comprises a liquid cosmetic material accommodating region 5 formed inside the main body tube 51, for accommodating liquid cosmetic material.

Here, the piston 2 is formed in a circular disc shape, which contacts integrally with the front end section of a movable body 13, and is inserted slidably in the axial direction into the main body tube 51 whilst contacting with the inner circumference thereof (see FIG. 1 and FIG. 2).

Moreover, the discharge lid 3 is installed on the front end of the main body tube 51 and serves to expel liquid type cosmetic material pressed out by the piston 2 in accordance with the movement of the movable body 13, from the front end of the main body tube 51 (see FIG. 1 and FIG. 2). Of course, the invention is not limited to this, and provided that it can be installed on the front end of the main body tube 51, it is possible to use a brush, or the like, for example.

Moreover, the cap 4 is installed detachably on the front end tube section 51a of the main body tube 51, and serves to cover the coating member 6, or the like (see FIG. 1).

As illustrated in FIG. 1 and FIG. 2, the movable body dispensing device 1 comprises a cylindrical main body 11, a cylindrical operating member 12, a cylindrical movable body 13, and a ratchet 14.

In other words, the movable body dispensing device 1 is constituted as a device which serves progressively to dispense a movable body 13 by causing the main body 11 and the operating member 12 to perform relative rotation.

Below, more detailed descriptions of the respective constituent elements are given.

(1) Main Body 11

The main body 11 is formed with a female screw thread 11a in the intermediate portion of the inner circumference thereof, which screws together with a male screw thread 13a of a screw thread section of the movable body 13 inserted from the rear side of the main body 11, and a collar section 11b comprising a step section between the inner circumference of the intermediate portion and the inner circumference of the portions other than the intermediate portion is formed inside the main body 11 (see FIG. 1 and FIG. 2).

Specifically, the main body 11 comprises a main body tube 51 and a cylindrical member 52, as illustrated in FIG. 1 and FIG. 2.

The main body tube 51 is constituted by a circular cylindrical shaped member (see FIG. 1 and FIG. 2).

As described in FIG. 1, the main body tube 51 comprises a front end tube section 51a having a smaller external diameter on the front side thereof, and a rear end tube section 51b having a larger internal diameter on the rear end side thereof.

As this diagram shows, a ring-shaped projection 51c is formed on the inner circumference of the main body tube 51 at a position of a prescribed length from the front end thereof, and a plurality of projecting ribs 51e extending for a prescribed length in the axial direction are formed at equidistant intervals in the circumferential direction, at a position in the vicinity of a step section 51d of the rear end tube section 51b, and furthermore, a ring-shaped depression 51f is formed in a position towards the rear end of the main body tube 51.

On the other hand, as shown in FIG. 1, the cylindrical member 52 is inserted and disposed in a position towards is the step section 51d inside the rear end tube section 51b of the main body tube 51.

Figure 3:
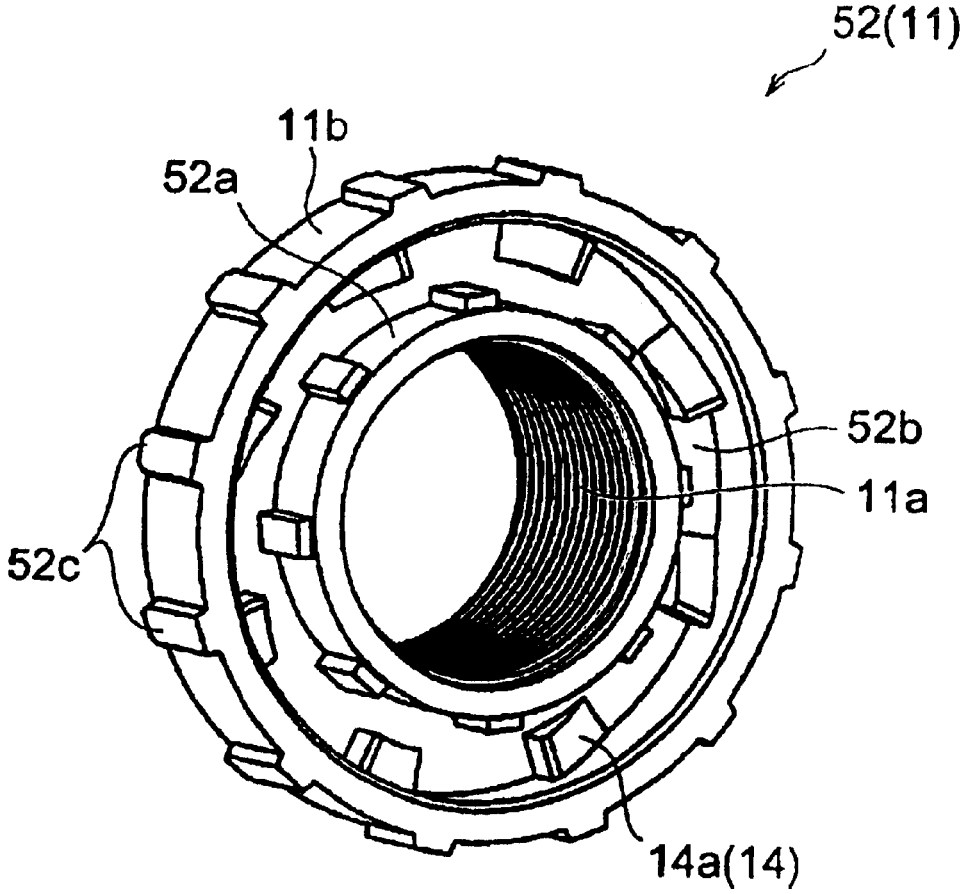
FIG. 3 is an oblique view showing a cylindrical member (main body) in FIG. 1 and FIG. 2.

As shown in FIG. 3, the cylindrical member 52 comprises a circular tube section 52a forming a circular tube shape, and a collar section 11b forming a step section formed integrally with the external circumference of the circular tube section 52a.

As FIG. 3 also shows, a female screw thread 11a forming a tube side screw thread section is provided on the inner circumference of the circular tube section 52a, centrally about the axis thereof. Moreover, as the diagram also shows, the rear end of the collar section 11b is formed with a depressed ring-shaped groove 52b formed in a ring shape, and a plurality of ratchet teeth 14a facing towards the rear end and projecting in an inclined manner in one of the circumferential directions are provided at equidistant intervals in the circumferential direction on the bottom face of this ring-shaped groove 52b.

Furthermore, as FIG. 3 also shows, a plurality of projecting ribs 52c extending in the axial direction are formed at equidistant intervals in the circumferential direction on the outer circumference of the collar section 11b.

As illustrated in FIG. 1 and FIG. 2, this cylindrical member 52 is urged by a ratchet spring section 81, described hereinafter, provided further to the rear end side thereof, and is coupled with the main body tube 51 in a non-rotatable fashion by means of the front end edge portion of the collar section 11b abutting against the step section 51d of the rear end tube section 51b, whilst the respective projecting ribs 52c of the collar section 11b are positioned in between the respective plurality of projecting ribs 51e formed in an longitudinal direction on the inner circumference of the main body tube 51.

(2). Operating Member 12

Figure 4:
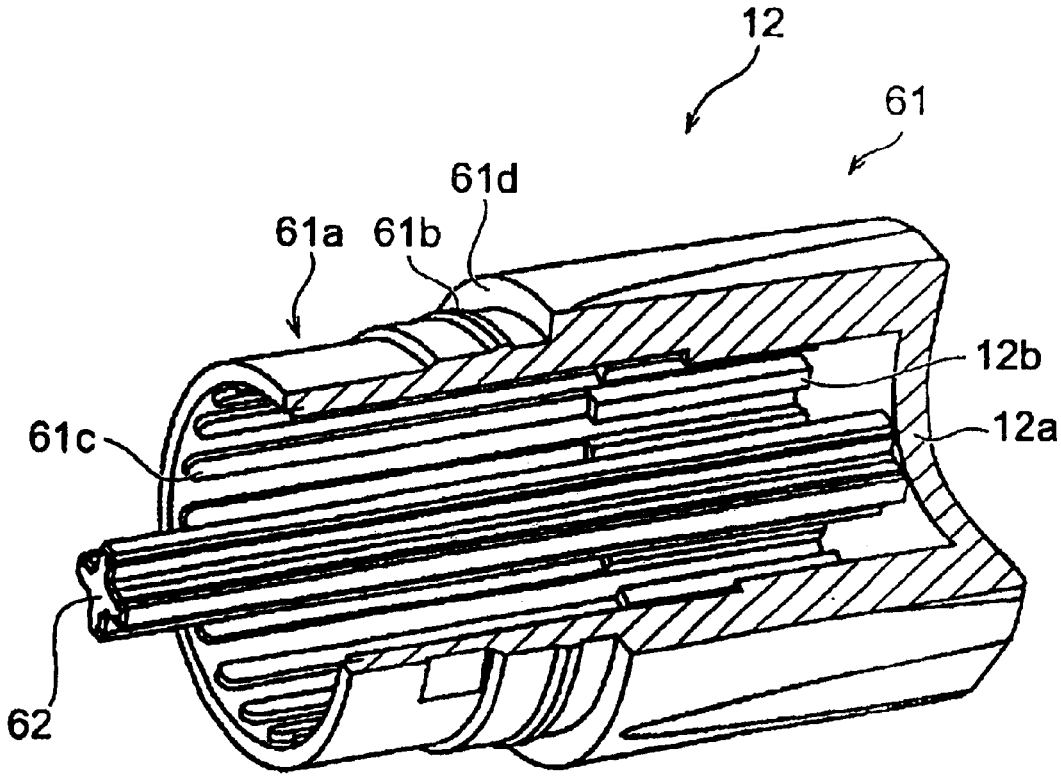
FIG. 4 is an oblique view showing an operating member in FIG. 1 and FIG. 2.

As shown in FIG. 1, FIG. 2 and FIG. 4, the operating member 12 has a base 12a on the rear end thereof, and is coupled to the rear end section of the main body 11 rotatably about the axis of the female screw thread 11a. A spring presser 12b forming a projecting section which projects further to the inner side than the front side of the inner circumference is provided intermittently in the circumferential direction on the rear side of the inner circumference of the operating member 12.

As illustrated by the diagrams, the operating member 12 is constituted by an operating tube 61 and a shaft member 62.

As shown in FIG. 4, the operating tube 61 is formed in a circular cylindrical shape. This operating tube 61 has a front end tube section 61a having a smaller external diameter on the front end thereof, and a ring-shaped projecting section 61b is provided on the outer circumference of this front end tube section 61a. Moreover, as illustrated by the diagram, a plurality of projecting ribs 61c extending for a prescribed length in the axial direction from the front end side are provided at equidistant intervals in the circumferential direction on the inner circumference of the operating tube 61, and spring pressers 12b are installed consecutively with the projecting ribs 61c, extending until the base 12a and projecting beyond the projecting ribs 61c towards the central axis.

As shown in FIG. 1, FIG. 2 and FIG. 4, the front end tube section 61a of the operating tube 61 is inserted inside the rear end tube section 51b of the main body tube 51, the step section 61d of the front end tube section 61a abuts with the rear end face of the main body tube 51, and the ring-shaped projection section 61b fits into the ring-shaped depression 51f on the main body tube 51, thereby coupling the operating tube 61 to the main body tube 51 in a mutually rotatable fashion.

On the other hand, as shown in FIG. 1 and FIG. 2, the shaft member 62 is provided so as to project to the front side from the base 12a, and it is inserted inside the movable body 13 from the rear side of the movable body, slidably in the longitudinal direction and in a non-rotatable fashion.

Figure 5:
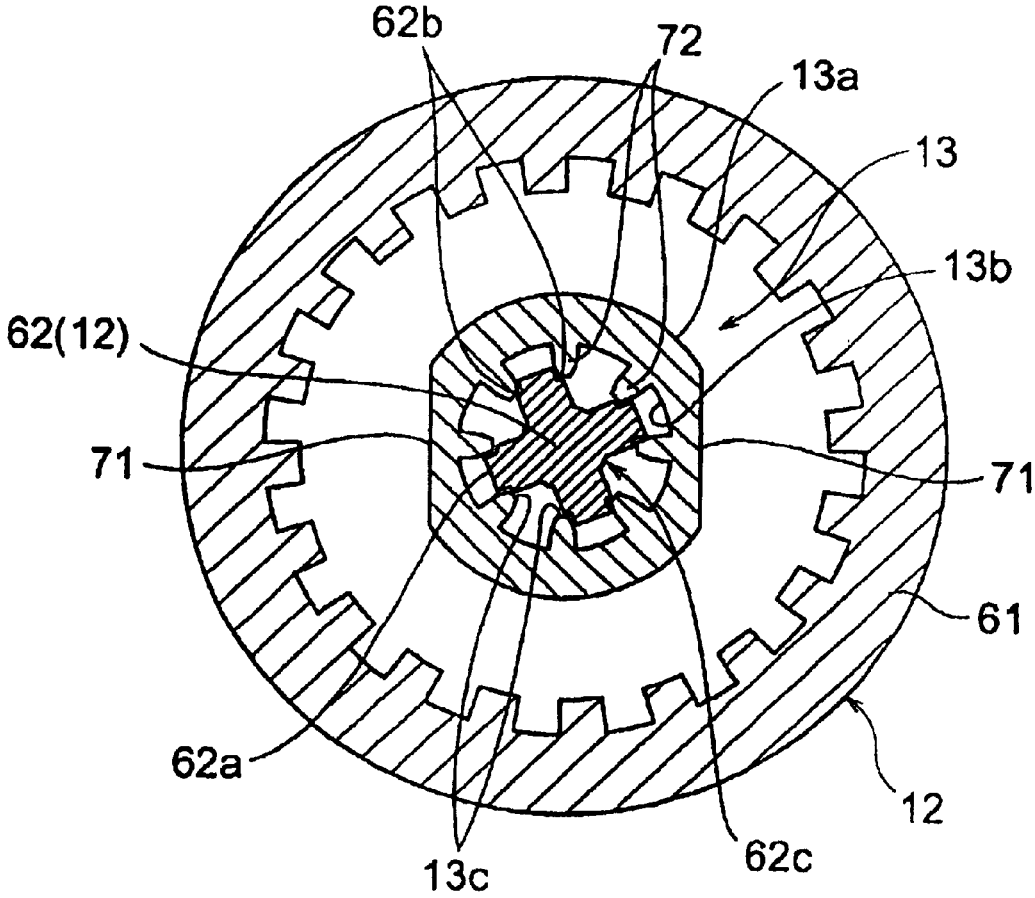
FIG. 5 is a sectional view along V—V in FIG. 1.

As shown in FIG. 4 and FIG. 5, the shaft member 62 is installed in a standing position in such a manner that it faces towards the front end side from the middle of the base 12a, and it has an approximately cross-shaped form. The shaft member 62 is formed integrally with the operating tube 61, from the viewpoint of reducing the number of components and facilitating the assembly process, but it may also be formed as a separate member which is coupled by insertion fitting, screw fitting, or the like.

In other words, by means of a shaft member 62 of this kind, it is possible to transmit the rotational force of the operating member 12 to the movable body 13 by means of a composition wherein it is inserted into the movable body 13 from the rear side of the movable body, and hence it is possible to maintain the same dispensing amount whilst shortening the overall length, compared to a conventional movable body dispensing device.

Here, as illustrated in FIG. 5, the shaft member 62 comprises a tube side rotation stopping (preventing) section on the outer circumference thereof. In other words, the shaft member 62 is formed with a plurality of depression sections (in the present embodiment, four depression sections) 62c having a recess shaped cross-section, by excavating respective positions at 90° intervals in the circumferential direction, in a recess shaped cross section, in addition to which, a plurality of projecting ribs (in the present embodiment, four projecting ribs) 62a respectively projecting towards the outer side and extending in the longitudinal direction are formed on either side of the depression sections 62c in the circumferential direction. Moreover, as FIG. 5 also shows, the movable body 13 is provided with a movable body rotation halting (preventing) section on the inner circumference thereof. In other words, a plurality of grooves 13b which fit together with the projecting ribs 62a are formed on the inner circumference of the movable body 13, and projecting ribs 72 are formed on either side of these grooves 13b. The front end edges of the projecting ribs 72 of the movable body 13 form supported edges 13c, constituting supported sections which are supported by the shaft member 62.

Moreover, as also shown in FIG. 5, the projecting ribs 62a of the shaft member 62 are constituted by projecting ribs which are slightly larger than the size of the grooves 13b of the movable body 13, in the region from the intermediate portion of the projecting ribs 62a until the base end side thereof, in such a manner that the projecting ribs 62a can be inserted inside the grooves 13b of the movable body 13, from the front end side until the intermediate portion of the projecting ribs 62a, whilst further insertion thereof beyond this is prevented and the movable body 13 and the shaft member 62 are maintained in a prescribed relative position in the radial direction (thereby preventing divergence between the central axles of same). Step sections in the intermediate portion of the projecting ribs 62a form supporting edges 62b which constitute supporting sections for supporting the supported edges 13c of the movable body 13. The composition for preventing further insertion of the projecting ribs 62a of the shaft member 62 inside the grooves 13b is not limited to the step-shaped step sections according to the present embodiment, it also being possible to adopt projecting ribs having oblique faces, or the like, or to adopt projecting ribs having a collar section, or the like, and in short, the intermediate regions of the projecting ribs 62a should be formed to a larger size than the front end sections thereof which are inserted inside the grooves 13b, and they should also be formed to a larger size than the grooves 13b.

Here, it is also possible to envisage a comparative composition wherein the shaft member is formed with a circular cross section, projecting ribs being provided at prescribed positions on the outer circumference of the circular, and slightly larger holes and grooves are formed on the movable body in a corresponding pattern to the shaft member provided with the projecting ribs, thereby maintaining the movable body and the shaft member in a prescribed relative position in the radial direction, but in the composition of this comparative example, there would be a large difference between the material thickness of the regions of the shaft member other than the projecting ribs (the shaft core portion) and the material thickness of the projecting ribs, and consequently, the surface of the moulded component is liable to have sink mark and in order to prevent such the sink mark, it is necessary to increase the moulding time, in addition to which, deformations, such as warping, bending, fracturing, or the like, become liable to occur due to the residual stress, in accordance with the non-uniform hardness caused by the non-uniform material thickness.

However, in the present embodiment, the composition of the projecting ribs 62a of the shaft member 62 formed by excavating same in a recess shaped cross section in a plurality of locations involves inserting the region from the front end to the intermediate portion thereof inside the grooves 13b of the movable body 13, the portion from the intermediate portion to the base end side being formed to a larger size than the intermediate portion inserted into the grooves 13b, but since the composition involves the formation of projecting ribs, the form of the shaft member 62 including the projecting ribs 62a can be approximated to a composition wherein projecting ribs extend radially from the central axis of the shaft, as in a cross-shaped cross-section, for example, in such a manner that the material thickness of the shaft member 62 can be homogenized throughout the whole shaft member 62, in comparison to the aforementioned comparative example.

(3) Movable Body 13

As shown in FIG. 5, the movable body 13 is formed in a cylindrical shape and a male screw thread 13a is formed on the external circumference thereof.

More specifically, as this diagram also shows, the movable body 13 comprises two planar face sections 71 formed at mutually opposing positions on the external circumference of a cylindrical member and extending along the full length thereof, and a male screw thread 13a formed extending in the axial direction on the curved surface except for the two planar face sections 71.

Furthermore, as shown in FIG. 5, the internal diameter of the rear end side of the movable body 13 is a reduced diameter and a plurality of projecting ribs 72 extending in the axial direction are formed approximately equidistantly in the circumferential direction on the inner circumference of this rear end of reduced diameter.

As shown in FIG. 1, the movable body 13 is engaged slidably in the axial direction and in a non-rotatable fashion, with respect to the shaft member 62, by means of the front end section of the male screw thread 13a screwing together with the female screw thread 11a on the inner circumference of the cylindrical member 52, whilst the projecting ribs 62a of the shaft member 62 forming a approximate cross shape are positioned between the projecting ribs 72, 72, and in this state, the rear end faces of the projecting ribs 72 are disposed in the vicinity of the base end section of the shaft member 62.

More specifically, as shown in the diagram, in this state, the shaft member 62 and the female screw thread 11a on the cylindrical member 52 and ratchet teeth 14a, 14b are disposed in mutually overlapping positions in the same plane orthogonal to the axial direction.

(4) Ratchet 14

Figure 6:
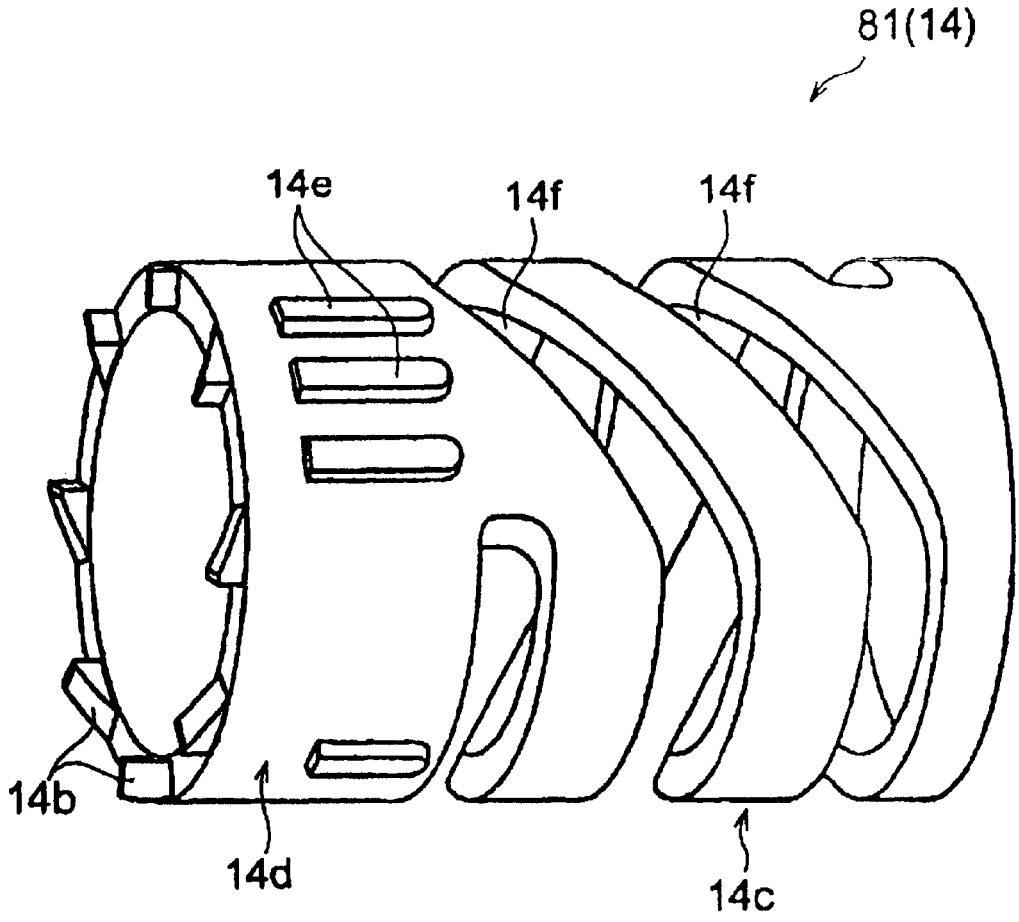
FIG. 6 is an oblique view showing a ratchet spring section (ratchet) in FIG. 1 and FIG. 2.

As illustrated in FIG. 3 and FIG. 6, the ratchet 14 comprises a set of ratchet teeth, in other words, the ratchet teeth 14a on the cylindrical member 52, and ratchet teeth 14b and ratchet spring 14c on the ratchet spring section 81, described hereinafter, and it is used in order to restrict the movement of the movable body 13 in the forward direction or rearward direction.

More specifically, as these diagrams illustrate, the ratchet 14 comprises a cylindrical ratchet spring section 81 in which either one of the sets of ratchet teeth 14a, 14b, and the ratchet spring 14c are formed in an integral fashion. As shown in FIG. 1 and FIG. 2, the ratchet spring section 81 is sandwiched between the collar section 11b of the cylindrical member 52 forming a step section and the spring pressers 12b of the operating tube 61 forming a projecting section, in such a manner that the shaft member 62 is able to penetrate through the inner side of the ratchet spring section 81 and thereby pass inside the movable body 13.

In other words, according to the ratchet spring section 81 of this kind, it is possible for the shaft member 62 to penetrate through the inner side thereof and thereby pass inside the movable body 13, and hence it is possible to maintain the same dispensing amount whilst shortening the overall length, in comparison with a conventional movable body dispensing device.

Of course, the ratchet spring section 81 is not limited to this and it is also possible for it to be provided sandwiched between the collar section 11b of the cylindrical member 52 forming the step section and the inner portion of the operating member 12, in such a manner that the shaft member 62 is able to penetrate through the inner side thereof and thereby pass inside the movable body 13. In other words, it is also possible to use a ratchet spring section 81 which is sandwiched, for example, between the collar section 11b of the cylindrical member 52 and the base 12a of the operating member 12, or the like.

More specifically, the ratchet spring section 81 is formed from synthetic resin, as illustrated in FIG. 7, and comprises a circular tube section 14d formed in a circular tube shape, and a ratchet spring 14c formed a circular tube shape provided consecutively to the rear end of the this circular tube section 14d.

As the diagram shows, the circular tube section 14d comprises a plurality of ratchet teeth 14b, provided at equidistant intervals in the circumferential direction on the front end face thereof, which project in an inclined fashion in such a manner that face towards to the front end side and mesh with the ratchet teeth 14a. Moreover, as shown in the diagram, a plurality of projecting ribs 14e extending for a prescribed length in the axial direction are formed on the outer circumference of the circular tube section 14d at equidistant intervals in the circumferential direction. Furthermore, as shown in this diagram, the ratchet spring 14c comprises a slit 14f cut out in a spiral fashion on the outer circumference thereof, in such a manner that the ratchet spring 14c can be extended or compressed by means of this slit 14f, thereby generating a force of impulsion.

As shown in FIG. 1, this ratchet spring section 81 is coupled in a non-rotatable manner to the operating tube 61, by means of the ratchet spring 14c being compressed between the collar section 11b of the cylindrical member 52 and the spring pressers 12b of the operating tube 61 and generating a force of impulsion in the longitudinal direction, the ratchet teeth 14a, 14b meshing together (the ratchet teeth 14a, 14a being positioned mutually between ratchet teeth 14b, 14b), and furthermore, the front end edge section of the collar section 11b of the cylindrical member 52 abutting the step section 51d of the rear end tube section 51b, in which state, the respective projecting ribs 14e of the circular tube section 14d are positioned between the respective projecting ribs 61c, 61c of the operating tube 61.

As described above, in the movable body dispensing device 1 of this kind, it is possible to transmit the rotational force generated by the operating member 12, to the movable body 13, by means of a shaft member 62 inserted slidably in the longitudinal direction in a non-rotatable manner inside the cylindrical shaped movable body 13, and moreover, the shaft member 62 penetrates the inside of the ratchet spring section 81 to enable the movable body 13 to pass through. Further, the shaft member 62 penetrates through the female screw thread 11a of the main body 11 which screws together with the male screw thread 13a of the movable body 13.

Consequently, according to the movable body dispensing device 1 of this kind, the shaft member 62 forming the tube side rotation preventing section and the female screw thread 11a of the main body 11 forming the tube side screw thread section overlap mutually in the same plane orthogonal to the axial direction, and furthermore, the shaft member 62 and the ratchet teeth 14a, 14b overlap mutually in the same plane orthogonal to the axial direction, thereby making it possible to shorten the overall length compared to the prior art, whilst maintaining the same dispensing amount, and hence allowing satisfactory downsizing of the eventual product.

Moreover, according to the movable body dispensing device 1, since the shaft member 62, the female screw thread 11a and the ratchet teeth 14a, 14b overlap mutually in the same plane orthogonal to the axial direction, further downsizing can be achieved.

Furthermore, according to the movable body dispensing device 1, since the intermediate portions of the projecting ribs 62a (the region from the intermediate portion to the base end in the present embodiment) are constituted by projecting ribs which are larger than the size of the grooves 13b, in such a manner that the region of the projecting ribs 62a from the front end side to the intermediate portion thereof can be introduced inside the grooves 13b of the movable body 13, and further insertion beyond this is prevented, the movable body 13 and the shaft member 62 being maintained in prescribed relative positions in the radial direction, then the projecting ribs does not need to be made longer than necessary, thereby making it possible to avoid unnecessary forming processes.

In addition, in a movable body dispensing device 1 of this kind, since the aforementioned projecting ribs 62a of the shaft member 62 are formed by excavating a plurality of locations in a recess shaped cross section, it is possible to approximate the shape of the shaft member 62 including the projecting ribs 62a to a composition wherein the projecting ribs extend radially from the central axis of the shaft, thereby making it possible to homogenize the material thickness throughout the whole shaft member 62.

As a result, the sink mark of the surface of the moulded components can be prevented, without lengthening the moulding time, and furthermore, an even hardness is achieved and hence deformations, such as warping, bending, fracturing, or the like, are not liable to occur.

In this way, according to the movable body dispensing device relating to the present invention, it is possible to shorten the overall length of the device in comparison to the prior art, whilst maintaining the same dispensing amount, thereby making it possible to compactify manufactured products satisfactorily.

What is claimed is:

1. A movable body dispensing device comprising: a cylindrical movable body having a male screw thread formed on the external circumference thereof; a cylindrical main body having a female screw thread which screws together with the male screw thread of said movable body, formed on the intermediate portion of the internal circumference thereof; a cylindrical operating member coupled rotatably to the rear end section of said main body, comprising a shaft member provided so as to project towards the front side from a base provided at the rear end thereof, said shaft member being fittable slidably in the longitudinal direction, in a non-rotatable fashion, into said movable body engaged with said female screw thread; and a ratchet comprising a set of ratchet teeth and a ratchet spring, for restricting the movement of said movable body in the forward direction or rearward direction; said movable body being progressively dispensed by causing relative rotation of said main body and said operating member;

wherein a step section is formed on the inner part of said cylindrical main body between the internal circumference of said intermediate portion and the internal circumference of the region apart from said intermediate portion;

said ratchet comprises a cylindrical ratchet spring section whereon at least one of said set of ratchet teeth and said ratchet spring are formed integrally; and said ratchet spring section is sandwiched between the step section of said main body and the inner side of said operating member, in such a manner that said shaft member penetrates through the inner side of said ratchet spring section and thereby enables said movable body to pass through the same.

2. A movable body dispensing device comprising: a cylindrical movable body having a male screw thread formed on the external circumference thereof; a cylindrical main body having a female screw thread which screws together with the male screw thread of said movable body, formed on the intermediate portion of the internal circumference thereof; and a cylindrical operating member coupled rotatably to the rear end section of said main body, comprising a shaft member provided so as to project towards the front side from a base provided at the rear end thereof, said shaft member being fittable slidably in the longitudinal direction, in a non-rotatable fashion, into said movable body engaged with said female screw thread; said movable body being progressively dispensed by causing relative rotation of said main body and said operating member;

wherein a plurality of projecting ribs respectively projecting to the outer side and extending in the longitudinal direction are formed in the circumferential direction on the external circumference of said shaft member;

a plurality of grooves which fit mutually with the projecting ribs of said shaft member are formed on the internal circumference of said movable body; and said projecting ribs of said shaft member are constituted by projecting ribs wherein the intermediate portion thereof is larger than the size of said grooves, in such a manner that the region thereof from the front end side to said intermediate portion thereof can be inserted inside the grooves of said movable body, further insertion beyond this being prevented and said movable body and said shaft member being maintained in prescribed relative positions in the radial direction.

3. The movable body dispensing device according to claim 2, wherein the projecting ribs of said shaft member are formed on either side of depressions having a hollow cross section, by excavating a plurality of locations so as to form a hollow cross section.

4. A movable body dispensing device comprising: a main body tube; an operating tube provided on the rear end section of said main body tube and capable of relative rotation with respect to said main body tube; a movable body comprising a rotation preventing section and a screw thread section, inserted inside said main body tube and said operating tube; a tube side rotation preventing section for engaging in a non-rotatable fashion with the rotation preventing section of said movable body and guiding said movable body slidably in the axial direction; a tube side screw thread section for engaging with the screw thread section of said movable body; and ratchets provided respectively on the main body tube and the operating tube, for mutually meshing and permitting rotation in one direction in synchronism with said relative rotation; said movable body being dispensed progressively towards the front end of said main body tube by means of the engagement of said screw thread sections, the screwing together of said rotation preventing sections, and the meshing of said ratchets;

wherein said movable body is formed in a cylindrical shape, and provided with the screw thread section of said movable body on either one of the inner circumference or external circumference thereof, and with the rotation preventing section of said movable body in the other of said inner circumference or external circumference; and said tube side rotation preventing section, said tube side screw thread section and said ratchets are arranged in an overlapping fashion in the same plane orthogonal to the axial direction.

5. The movable body dispensing device according to claim 4, comprising:

a shaft member installed on the base section of the operating tube so as to protrude in the axial direction; and a cylindrical member having a cylindrical shape and being installed so as to surround the front end side of said shaft member, whilst also being coupled in a non-rotatable fashion to said main body tube;

wherein said movable body is inserted in between said shaft member and said cylindrical member, the rotation preventing section of the movable body being provided on the internal circumference of said movable body, and the screw thread section of the movable body being provided on the external circumference of said movable body;

said tube side rotation preventing section is provided on the external circumference of said shaft member and engages with the rotation preventing section of the movable body formed on the internal circumference of said movable body;

said tube side screw thread section is provided on the internal circumference of said cylindrical member and screws together with the screw thread section of the movable body on the external circumference of said movable body; and said ratchets are arranged in such a manner that they surround said cylindrical member.

6. The movable body dispensing device according to claim 4, comprising:

a shaft member installed on the base section of the operating tube in a protruding manner in the axial direction; and a cylindrical member having a cylindrical shape and being installed so as to surround the front end side of said shaft member, whilst also being coupled in a non-rotatable fashion to said main body tube;

wherein said movable body is inserted in between said shaft member and said cylindrical member, the rotation preventing section of the movable body being provided on the external circumference of said movable body, and the screw thread section of the movable body being provided on the internal circumference of said movable body;

said tube side rotation preventing section is provided on the internal circumference of said cylindrical member and engages with the rotation preventing section of the movable body formed on the external circumference of said movable body;

said tube side screw thread section is provided on the external circumference of said shaft member and screws together with the screw thread section of the movable body on the internal circumference of said movable body; and said ratchets are arranged in such a manner that they surround said cylindrical member.

*7. A movable body dispensing device comprising:*

*a cylindrical main body;*

*a cylindrical member disposed on an intermediate portion of an internal circumference of the main body in a non-rotatable fashion and including a circular tube section, a female screw thread provided on an inner circumference of the circular tube section, a collar section formed integrally with an external circumference of the circular tube section, a depressed ring-shaped groove formed on a rear end of the collar section, and ratchet teeth provided on a bottom face of the ring-shaped groove;*

*a movable body including a male screw thread which screws together with the female screw thread of the cylindrical member;*

*a cylindrical operating member coupled rotatably to a rear end section of the main body and holding the movable body, which is screwed onto the cylindrical member, non-rotatable to the operating member and slidable in a longitudinal direction; and*

*a cylindrical ratchet spring section including a ratchet spring and ratchet teeth which is meshed with the ratchet teeth of the cylindrical member and is formed integrally with the ratchet spring;*

*wherein the cylindrical ratchet spring section is sandwiched between the cylindrical member and the operating member in such a manner that the movable body penetrates through an inner side of the ratchet spring section; and*

*the movable body is progressively dispensed by causing relative rotation of the main body and the operating member.*

*8. The movable body dispensing device according to claim 7,*

*wherein the main body includes a plurality of projecting ribs provided in a substantially longitudinal direction on an inner circumference; and*

*the cylindrical member further includes a plurality of projecting ribs provided in a circumferential direction on an outer circumference of the collar section and extending in an axial direction; and*

*the projecting ribs of the cylindrical member are positioned in between the respective plurality of projecting ribs of the main body so that the cylindrical member is coupled with the main body in a non-rotatable fashion.*

*9. The movable body dispensing device according to claim 7,*

*wherein the ratchet spring of the ratchet spring section includes a slit cutting out an outer circumference of a circular tube shape of the ratchet spring section.*

*10. A movable body dispensing device comprising:*

*a cylindrical movable body including a male screw thread formed on an external circumference thereof;*

*a cylindrical main body including a female screw thread which screws together with the male screw thread of the movable body and is formed on an intermediate portion of an internal circumference thereof;*

*a cylindrical operating member coupled rotatably to a rear end section of the main body and including a shaft member which projects towards a front side from a base provided at a rear end thereof and is fittable in a non-rotatable fashion and slidable in the longitudinal direction with respect to the movable body engaged with the female screw thread of the cylindrical main body; and*

*a ratchet restricting the movement of the movable body in a forward direction or a rearward direction and including a pair of ratchet teeth and a cylindrical ratchet spring section having a ratchet spring,*

*wherein the movable body is progressively dispensed by causing relative rotation of the main body and the operating member,*

*a step section is formed on the inner part of the main body between the internal circumference of the intermediate portion and the internal circumference of a region apart from the intermediate portion,*

*the ratchet spring and one of the ratchet teeth are formed integrally, and*

*the ratchet spring section of the ratchet is sandwiched between the step section of the main body and an inner side of the operating member, in such a manner that the shaft member of the operating member penetrates through an inner side of the ratchet spring section to enable the movable body to pass through the ratchet spring section.*

*11. A movable body dispensing device comprising:*

*a cylindrical movable body including a male screw thread formed on an external circumference thereof;*

*a cylindrical main body including a female screw thread which screws together with the male screw thread of the movable body and is formed on an intermediate portion of an internal circumference thereof; and*

*a cylindrical operating member coupled rotatably to a rear end section of the main body and including a shaft member which projects towards a front side from a base provided at a rear end thereof and is fittable in a non-rotatable fashion and slidable in the longitudinal direction with respect to the movable body engaged with the female screw thread of the cylindrical main body,*

*wherein the shaft member of the cylindrical operating member has a plurality of projecting ribs which respectively projects to an outer side and extends in a longitudinal direction and are formed in a circumferential direction on an external circumference of said shaft member,*

*the movable body is progressively dispensed by causing relative rotation of the main body and the operating member and includes a plurality of grooves which fit mutually with the projecting ribs of the shaft member and are formed on an internal circumference of the movable body, and*

*the size of the intermediate portion of the projecting ribs of the shaft member is formed larger than the size of the grooves of the movable body.*

*12. The movable body dispensing device according to claim 11,*

*wherein the projecting ribs of the shaft member are formed on either side of depressions having a hollow cross section which excavates the shaft member.*

*13. A movable body dispensing device comprising:*

*a main body tube;*

*an operating tube provided on a rear end section of the main body tube and capable of relative rotation with respect to the main body tube;*

*a cylindrical movable body inserted inside the main body tube and the operating tube and including a rotation preventing section and a screw thread section;*

*a tube side rotation preventing section engaging in a non-rotatable fashion with the rotation preventing section of the movable body and guiding the movable body slidably in an axial direction;*

*a tube side screw thread section engaging with the screw thread section of the movable body; and*

*ratchets provided respectively on the main body tube and the operating tube, for mutually meshing and permitting rotation in one direction in synchronism with the relative rotation,*

*wherein the movable body is dispensed progressively towards the front end of the main body tube by screwing of the tube side screw thread section and the screw thread section of the movable body, the engagement of the tube side rotation preventing section and the rotation preventing section of the movable body, and the meshing of the ratchets when main body tube is relatively rotated with respect to the operating tube,*

*the screw thread section of the movable body is provided on one of an inner circumference and an external circumference, and the rotation preventing section of the movable body is provided on the other of the inner circumference and the external circumference, and*

*the tube side rotation preventing section, the tube side screw thread section and the ratchets are arranged in an overlapping fashion in the same plane orthogonal to an axial direction.*

*14. The movable body dispensing device according to claim 13, further comprising:*

*a shaft member installed on a base section of the operating tube and protruded in the axial direction; and*

*a cylindrical member surrounding a front end side of the shaft member and coupled to the main body tube in a non-rotatable fashion,*

*wherein the movable body is inserted in between the shaft member and the cylindrical member,*

*the rotation preventing section of the movable body is provided on an internal circumference,*

*the screw thread section of the movable body is provided on the external circumference,*

*the tube side rotation preventing section is provided on the external circumference of the shaft member and engages with the rotation preventing section of the movable body,*

*the tube side screw thread section screws together with the screw thread section of the movable body provided on an internal circumference of the cylindrical member, and*

*the ratchets surround the cylindrical member.*

*15. The movable body dispensing device according to claim 13, further comprising:*

*a shaft member installed on a base section of the operating tube and protruded in the axial direction; and*

*a cylindrical member surrounding a front end side of the shaft member and coupled to the main body tube in a non-rotatable fashion,*

*wherein the movable body is inserted in between the shaft member and the cylindrical member,*

*the rotation preventing section of the movable body is provided on an external circumference,*

*the screw thread section of the movable body is provided on the internal circumference,*

*the tube side rotation preventing section is provided on the internal circumference of the cylindrical member and engages with the rotation preventing section of the movable body,*

*the tube side screw thread section screws together with the screw thread section of the movable body, and*

*the ratchets surround the cylindrical member.*

* * * * *